J. COAN.
TIRE ARMOR.
APPLICATION FILED JAN. 3, 1910. RENEWED AUG. 29, 1910.
1,103,396.
Patented July 14, 1914.
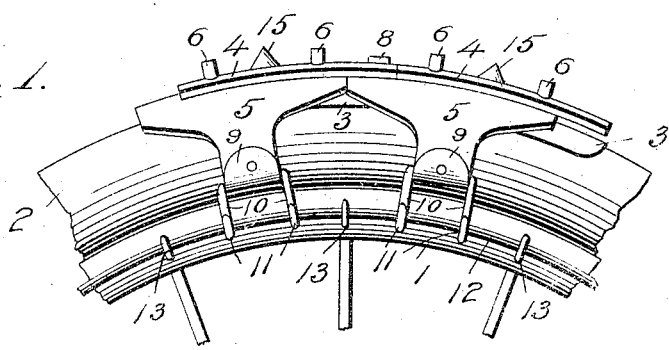
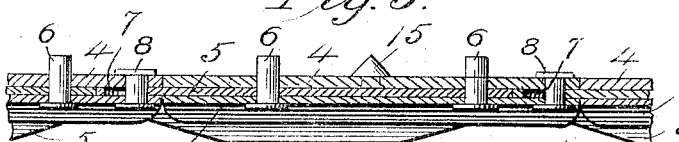
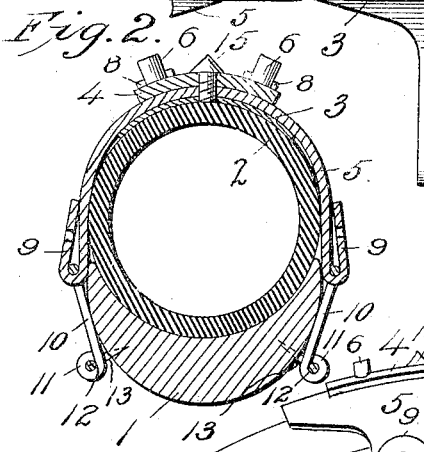
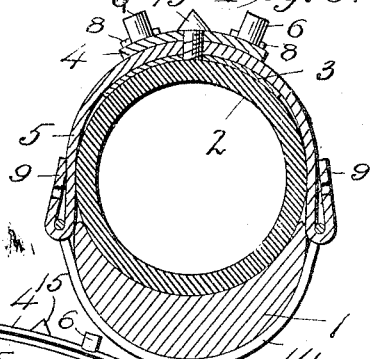
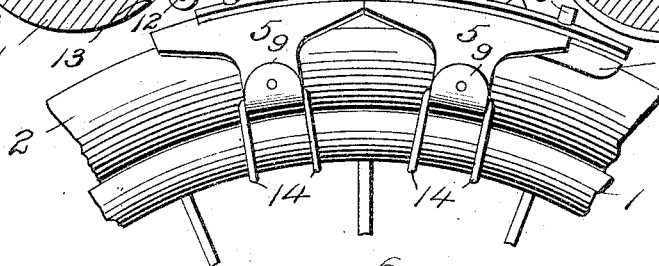
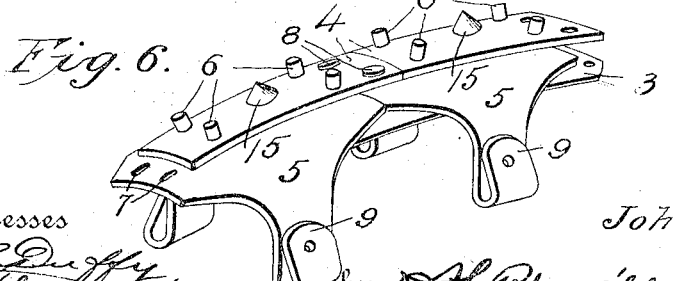
Inventor
John Coan

UNITED STATES PATENT OFFICE.

JOHN COAN, OF KANSAS CITY, MISSOURI.

TIRE-ARMOR.

1,103,395.   Specification of Letters Patent.   Patented July 14, 1914.

Application filed January 3, 1910, Serial No. 535,977. Renewed August 29, 1910. Serial No. 579,563.

*To all whom it may concern:*

Be it known that I, JOHN COAN, a citizen of the United States, residing at Kansas City, in the county of Jackson and State of Missouri, have invented certain new and useful Improvements in Tire-Armors; and I do declare the following to be a full, clear, and exact description of the invention, such as will enable others skilled in the art to which it appertains to make and use the same.

This invention relates to improvements in tire armor.

One object of the invention is to provide a simple and improved construction of tire armor, the sections of which are secured together in such manner as to form overlapping but flexible joints, whereby the armor will readily adjust itself with the movement of the tire.

With the foregoing and other objects in view, the invention consists of certain novel features of construction, combination and arrangement of parts, as will be more fully described and particularly pointed out in the appended claims.

In the accompanying drawings, Figure 1 is a side view of a portion of a wheel and a pneumatic tire showing my improved armor thereon; Fig. 2 is a cross sectional view of the same; Fig. 3 is an enlarged vertical longitudinal section of a portion of the armor taken on a line with the connecting rivets at one side of the armor; Fig. 4 is a side view similar to Fig. 1, showing a modified arrangement of the armor attaching loops; Fig. 5 is a cross section of the same; Fig. 6 is a perspective view of one of the armor sections.

Referring more particularly to the drawings, 1 denotes the rim and 2 the pneumatic tire of a wheel. The rim and tire may be of any desired construction and with the outer or tread portion of the tire is adapted to be engaged my improved armor, whereby said tire is protected from being punctured or otherwise injured, and whereby skidding of the wheel is prevented.

My improved armor comprises an inner series of plates 3 which are preferably of oblong form and which are slightly curved in cross section to fit the curvature of the tread portion of the tire. Arranged on the outer side of the plates 3, is a series of tread plates 4 which are also preferably oblong in shape and are of less width than the inner tire engaging plates 3. Between each pair of plates 3 and 4 are secured connecting and armor attaching plates 5. The connecting plates 5 are arranged between the plates 3 and 4 so that one end of the connecting plates projects beyond one end of the plates 3 and 4 and said projecting end of the connecting plates is adapted to be inserted between the adjacent ends of the next pair of plates 3 and 4, thus providing for an interlocking connection between the sections of the armor.

The plates 3 and 4 and the connecting plate 5 of each section of the armor are securely fastened together by rivets or other suitable fastening devices 6. The ends of said rivets or fastening devices project beyond the outer sides of the tread plates and form spurs which will prevent the slipping or skidding of the wheel. The projecting ends of the connecting plates 5 have formed therein elongated holes or rivet slots 7 which are adapted to be engaged with connecting rivets 8 or similar fastening devices which are inserted through the inner and outer plates 3 and 4, as shown. By providing the slotted connection between the connecting plate of one section and the end of the adjoining section, said sections will be flexibly connected together to enable the same to conform to the movement of the tire.

On the opposite side edges of the connecting plates 5 are formed inwardly projecting hooks 9, with which are engaged wire fastening loops 10. The inner ends of the loops 10 are provided with eyes 11 which are engaged with an annular tire holding rod or ring 12 which is also engaged with a series of screw eyes 13 or other suitable fastening devices which are arranged in the sides of the wheel rim between the loops 10, as shown. By this means, the armor is securely held in place on the tire and may be readily removed therefrom when desired.

In Figs. 4 and 5, of the drawings, is shown a modified form of attaching devices for holding the armor in place on the tire. The connection shown in these figures comprises a series of wire loops 14, one end of each of which is engaged with the hook 9 on one side of the armor section, after which the loop or hook is passed around the inner side of the wheel rim and has its opposite end engaged with the hook on the opposite side of the armor section. In engaging the ends of the loops 14 with the hooks on the sections of the armor, said hooks will have to be sprung down to permit the engagement of the ends of the loops therewith.

In addition to the spurs formed by the ends of the fastening rivets, I also preferably employ a series of pointed anti-skidding spurs 15 having reduced threaded shanks which are adapted to be screwed into threaded apertures formed in the plates of the armor sections. By attaching the spurs 15 in this manner, they may be removed when worn and replaced by new spurs.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

Having thus described my invention, what I claim is:

1. A tire armor comprising a series of sections, each of which consists of an inner tire engaging plate, an outer tread plate, an intermediate connecting plate arranged between said inner and outer plates and projecting beyond one end of the same, said end being adapted to be engaged between the ends of the inner and outer plates of the adjoining section and having formed therein slots, connecting rivets arranged through the ends of said inner and outer plates and the slots in the ends of said connecting plates whereby the sections of the armor are flexibly connected together, and means to secure said armor to the tire and rim of a wheel.

2. A tire armor comprising a series of sections, means whereby said sections are flexibly connected together, each of which consists of an inner tire engaging plate, an outer tread plate, an intermediate connecting plate secured between said inner and outer plates, armor attaching hooks formed on the opposite side edges of said connecting plates, attaching loops adapted to be engaged with said hooks, eyes formed on the inner ends of said loops, a series of fastening devices arranged in the rim of the wheel, a fastening ring adapted to be engaged with the eyes in said loops and the fastening devices in said rim, whereby the armor is securely held in position on a wheel.

3. A tire armor comprising a series of inter-engaging sections, each section comprising three layers of material secured together, the central layer being displaced longitudinally relative to the other layers whereby there is formed at one end of the section a projecting tongue and at the other a corresponding pocket adapted to receive the tongue of the succeeding section, a pin passed through the projecting upper and lower layers which form said pocket, said tongue having an oblong slot therein in which the pin of an adjacent section is adapted to play.

In testimony whereof I have hereunto set my hand in presence of two subscribing witnesses.

JOHN COAN.

Witnesses:
W. P. HOOPER,
W. B. BABCOCK.